UNITED STATES PATENT OFFICE.

CARL WALTER VOLNEY, OF TOM'S RIVER, NEW JERSEY, ASSIGNOR TO ARDEN S. FITCH, OF NEW YORK, N. Y.

EXPLOSIVE COMPOUND.

SPECIFICATION forming part of Letters Patent No. 383,420, dated May 22, 1888.

Application filed November 2, 1887. Serial No. 254,101. (No specimens.)

*To all whom it may concern:*

Be it known that I, CARL WALTER VOLNEY, of Tom's River, Ocean county, State of New Jersey, a citizen of the United States, have invented an Improved Explosive Compound, of which the following is a specification.

The object of my invention is to produce an explosive compound for blasting purposes, composed, essentially, of ordinary granulated black blasting-powder and nitro-glycerine, which is absorbed by the black powder, and in which the grains or particles of the powder will have their absorption capacity augmented, and after absorbing the nitro-glycerine retain their granular form and structure.

Heretofore in combining nitro-glycerine with the granules of ordinary black blasting-powder the addition or absorption of the nitro-glycerine has caused the disintegration of the granulated powder, and has reduced the mixture to a pasty, sticky, or deliquated mass, which, as such, has been unserviceable as a true powder, and to remedy this the grains of the powder which is to receive the nitro-glycerine have heretofore been hardened and polished, and thus rendered practically non-absorbent; or such grains have been coated or varnished with a non-absorbent and fluid-resisting material, the treatment in either case being for the purpose of preventing the absorption by the powder granules of the nitro-glycerine, and to insure the adherence of the nitro-glycerine thereto when added as an external coating only; but any of such prevailing treatments of a granulated powder prior to the mixture therewith of nitro-glycerine, and as a preparatory step thereto, are necessarily comparatively costly and laborious and involve increased risk in the process of manufacture.

By means of my hereinafter-described invention I am enabled to obviate the necessity of a tedious, expensive, and comparatively dangerous preparation of the grains of the granulated powder to prevent their disintegration after the combination therewith of the nitro-glycerine, and I fabricate a blasting-powder in which the grains of the powder are not artificially hardened or polished, nor coated or varnished with a non-absorbing substance in the course of manufacture; but said grains have their absorption capacity increased, and when they have absorbed nitro-glycerine will not be thereby disintegrated or deliquated, but will retain their original form and structure, thus constituting as a completed compound a granulated powder which is a high explosive.

In carrying out my invention I employ the usual ingredients of ordinary black blasting-powder for the granulated powder—namely, charcoal, sulphur, and a nitrate, as of sodium. To these ingredients I add a certain quantity of starch in the form of a paste, as hereinafter set forth, and all these named ingredients, when mixed as hereinafter described, I granulate, as presently specified, and the resulting powder I combine with nitro-glycerine, as hereinafter set forth.

In fabricating this powder I proceed as follows: The starch is first converted into a paste or jelly by being dissolved, and then treated with boiling water. With this paste there is then thoroughly incorporated the ingredients of ordinary black blasting-powder, constituting the gas-producing material—namely, a mixture of charcoal, finely ground, sulphur, when used, and a nitrate, such as sodium, potassium, or ammonium nitrate. The mass being thus mixed in a wet state, there is no risk attending the operation. The mass when thoroughly mixed is spread out or rolled into sheets and dried, and then broken up or granulated in the ordinary manner.

The relative proportions of the charcoal, sulphur, and nitrate may be substantially those of ordinary black blasting-powder, and should of course be preferably such as will effect a perfect combustion of the carbon in the mixture on explosion. I find that the following proportions produce a good and effective result: seventy-three (73) parts, by weight, of sodium nitrate, twelve (12) parts of charcoal, and ten (10) parts of sulphur. I take five (5) parts of starch, by weight, and make the same into paste with eighteen (18) or nineteen (19) parts of water. Into the paste, heated, I stir and thoroughly mix the mixture of the charcoal, sulphur, and nitrate. The mass is then spread out in sheets, dried, and granulated in the manner usually employed in the manufacture of black powder. The mass of the gas-producing material, with which has been combined the starch-paste, as described, will, when the water of the paste is dried out or evaporated, be of a honeycombed or cellular structure, the water as it evaporates leaving fine or capillary interstices or cells extending throughout the mass, and the starch of the paste being left incorporated in the mass. When this dried mass is granulated, the granules will possess a greater absorptive capacity, owing to their cellular structure, than is possessed by grains of ordinary black powder formed of the usual ingredients in the customary manner. I have found that this granulated powder possesses the peculiar characteristic that the grains, while possessing the increased absorptive capacity stated, are not affected in form and structure nor deliquated by the absorption of nitro-glycerine, but that upon being mixed with nitro-glycerine and absorbing it they will retain their full granular form and structure, and the resultant mixture will maintain itself as a granulated powder. I find that the mixture of ten (10) parts of nitro-glycerine with ninety (90) parts of the described granulated powder will constitute an effective high explosive, especially adapted for use in blasting. The proportion of the nitro-glycerine in the completed compound may, however, be increased or decreased, depending upon the strength and quickness of detonation desired. In mixing the nitro-glycerine with the granular powder care should be taken that by stirring or rolling the powder in or upon the nitro-glycerine the latter is uniformly distributed to and upon the grains, so that the absorption may be substantially uniform in all the grains.

I am aware that starch has been heretofore used as an ingredient of explosive compounds, and hence I do not intend to claim, broadly, herein the use of starch as an ingredient; but its employment heretofore as an ingredient of black blasting-powder has been solely as a substitute for a greater or less portion of the carbonaceous material therein, and wholly with a view to economy in cost, and the explosive produced has been of an exceedingly low grade. Furthermore, when heretofore employed in a high explosive as an ingredient of the mixture of substances which absorbed nitro-glycerine, its employment, both as regards its proportion in the mixture and the substances with which it has been admixed, differs materially from its use in my invention and with a totally-different result, the resulting completed explosive after the absorption of nitro-glycerine having been in such cases a plastic or semi-plastic mass, resembling in permanent structure the several kinds of dynamite, and not a granulated powder.

I do not employ starch in my described compound as the equivalent of any portion of the carbon, nor, in fact, as a true ingredient of the gas-producing material of the granulated powder. Starch being slower in combustion, and thus less effective as a gas-producing substance in an explosive, its presence in any considerable proportion is not desirable in a compound intended to be a high explosive; but starch, as I employ it in my described invention, performs the sole function of rendering the mass of the gas-producing material, with which it is combined as a paste, cellular or honeycombed in structure when the water of the paste is evaporated, and preserves and maintains the granular structure of the grains when the same have absorbed nitro-glycerine, and the starch is present in my compound in so comparatively small a quantity or proportion that its presence does not practically affect the character of the compound as a high explosive. I am not aware that any one has heretofore combined starch with the gas-producing material of ordinary black powder in substantially the proportions stated, and thus produced a granulated powder which is cellular or honeycombed in structure and therefore of increased absorptive capacity, and which, when permitted to absorb nitro-glycerine, will retain and preserve its granular form.

I am furthermore not aware that a high explosive has been heretofore fabricated composed of ordinary black blasting-powder, with the ingredients of which has been combined starch, in the manner herein set forth, and forming an absorbent granular powder, together with nitro-glycerine absorbed by the granules, and in which resulting and completed explosive the granules of the powder, owing to the presence of the starch therein, while being absorbent, as stated, will maintain their granular structure after such absorption of nitro-glycerine, and do not in consequence of such absorption disintegrate or deliquate.

It is obvious that the proportions of the ingredients of the ordinary black powder in my compound may be varied within the limits specified, and also that sulphur may be omitted, the remaining oxidant—such as nitrate of of soda—being then proportionately increased; and, furthermore, that such carbohydrates—as for example, dextrine of flour of cereals containing starch in sufficient quantity as will by the presence thereof in the mixture produce the described cellular structure of the grains and maintain the granular character of the powder in the final compound after the nitro-glycerine has been absorbed by the granules—may be used in place of starch as a paste in my compound.

What I claim as my invention, and desire to secure by Letters Patent, is—

1. An explosive compound consisting of a mixture of charcoal and an oxidant, as nitrate of sodium, with which is combined starch in about the proportions named, and forming an absorbent granular powder, together with nitro-glycerine absorbed by the powder granules, said granules being maintained as such and constituting a granular powder after said absorption of nitro-glycerine, and adapted for use in such granular form, substantially as described.

2. As an article of manufacture, an absorbent granular powder composed of charcoal, an oxidant, as nitrate of sodium and starch, combined in about the proportions and in the manner specified, and constituting a powder the granules of which are cellular or honeycombed in structure, and adapted to absorb nitroglycerine and to maintain their granular form after such absorption, as set forth.

3. In the manufacture of an explosive compound, the process of producing a granular powder, which consists in combining starch dissolved and boiled in water as a paste, in about the proportion named, with the gas-producing ingredients of black powder—as, for example, charcoal and an oxidant, as sodium nitrate—and then evaporating the water of the paste from the mass, whereby when the dried mass is granulated the resulting granular powder will consist of granules which are cellular or honeycombed in structure, and which are adapted to absorb nitro-glycerine and will maintain their granular form subsequent to such absorption, as set forth.

CARL WALTER VOLNEY.

Witnesses:
H. T. ABRAMS,
F. A. BRAINERD.